(12) United States Patent
Burkett et al.

(10) Patent No.: US 8,709,260 B2
(45) Date of Patent: Apr. 29, 2014

(54) AUTOMATIC COOKING MEDIUM FILTERING SYSTEMS AND METHODS

(71) Applicants: Douglas A. Burkett, Eaton, OH (US); Thomas Lee Gort, Germantown, OH (US); Gary L. Mercer, Eaton, OH (US)

(72) Inventors: Douglas A. Burkett, Eaton, OH (US); Thomas Lee Gort, Germantown, OH (US); Gary L. Mercer, Eaton, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 14/048,022

(22) Filed: Oct. 7, 2013

(65) Prior Publication Data

US 2014/0034583 A1 Feb. 6, 2014

Related U.S. Application Data

(62) Division of application No. 12/475,051, filed on May 29, 2009, now Pat. No. 8,551,331.

(51) Int. Cl.
*B01D 37/00* (2006.01)
*A47J 37/12* (2006.01)
*B01D 36/00* (2006.01)
*B01D 35/02* (2006.01)
*B01D 35/143* (2006.01)

(52) U.S. Cl.
USPC ............... 210/741; 210/85; 210/90; 210/100; 210/106; 210/109; 210/143; 210/167.28; 210/194; 210/257.1; 210/DIG. 8; 210/739

(58) Field of Classification Search
USPC ............... 210/85, 90, 97, 100, 106, 109, 143, 210/167.28, 194, 252, 257.1, 258, 73, 9, 210/741
See application file for complete search history.

(56) References Cited

U.S. PATENT DOCUMENTS

| | | | |
|---|---|---|---|
| 4,502,373 A | 3/1985 | Keating | |
| 5,617,777 A | 4/1997 | Davis et al. | |
| 5,776,530 A | 7/1998 | Davis et al. | |
| 6,009,794 A | 1/2000 | Casey et al. | |
| 6,202,543 B1 | 3/2001 | Moya et al. | |
| 6,254,790 B1 | 7/2001 | King et al. | |
| 2006/0130670 A1 | 6/2006 | Johnson et al. | |
| 2008/0121578 A1 | 5/2008 | Burkett et al. | |
| 2010/0116345 A1 | 5/2010 | Florkey et al. | |

*Primary Examiner* — John Kim
(74) *Attorney, Agent, or Firm* — Baker Botts L.L.P.

(57) ABSTRACT

An automatic filtering system for filtering a cooking medium in a fryer, includes a frypot; a filter manifold having removable filter; a pump, that supplies cooking medium from the filter manifold to the frypot; a pressure sensor that senses a pressure of the cooking medium supplied by the pump; and a controlling mechanism that controls an operation of the pump in response to the sensed pressure data. The control mechanism halts the operation of the pump after sensing a drop in the pressure of the cooking medium pressure that is greater than or equal to a predetermined pressure drop threshold. The systems and methods of the invention provide automatic filtering that may reduce or eliminate an incorrect refilling operation after the filtering of cooking medium, so that the filtering process may be performed correctly each time.

11 Claims, 9 Drawing Sheets

AUTOMATIC COOKING MEDIUM FILTERING SYSTEMS AND METHODS

CROSS-REFERENCE TO RELATED APPLICATION

This application is a divisional of U.S. patent application Ser. No. 12/475,051 filed on May 29, 2009, now U.S. Pat. No. 8,551,331, the disclosure of which is incorporated herein by reference.

BACKGROUND OF THE INVENTION

1. Field of the Invention

The present invention relates generally to systems and methods for automatically filtering a cooking medium in a cooking apparatus, such as a fryer.

2. Description of Related Art

Known fryers, e.g., open-well fryers and pressure fryers, are used to cook various food products, e.g., poultry, fish, or potato products. Such fryers include a cooking vessel, e.g., a frypot, and the cooking vessel is filled with a cooking medium, e.g., an oil, a liquid shortening, or a meltable-solid shortening. Such fryers also include a heating element, e.g., an electrical heating element, such as a heating coil, or a gas heating element, such as a gas burner and gas conveying tubes, which heat the cooking medium in the cooking vessel. After the cooking medium reaches a preset cooking temperature, the food product is placed into the cooking medium, such that the food product is cooked in the cooking medium. For example, the food product may be positioned inside a product holder, e.g., a wire basket, and submerged in the cooking medium for a predetermined amount of time sufficient to cook or to complete the cooking of the food product. The amount of time sufficient to cook or to complete the cooking of the food product at a given cooking temperature depends on the type of food product which is cooked. Moreover, the cooking medium is used during several cooking cycles before the cooking medium inside the cooking vessel is filtered, replaced, or supplemented with a new or filtered supply of cooking medium.

Cooking medium may be filtered periodically to maintain cooking quality and to prolong the operational lifetime of the cooking medium. The filtering process removes cooking by-products, e.g., suspended food particles, ranging from dust-sized particles to larger pieces of crackling and small pieces of food product. Known contemporary filtering systems require the operator to manipulate valves to route the cooking medium through the filter and to return it to a cooking vessel, e.g., a frypot, disposed within the fryer. Even experienced operators may open or close the valves incorrectly, which increases operating expenses through lost time. Periodically, the drain pan under the fryer may be removed for cleaning or to discard the cooking medium. If the operator fails to replace the drain pan and opens the drain valve, the cooking medium drains out of the fryer and may be wasted, which greatly increases operating expenses. Moreover, it is generally desirable to filter the cooking medium for an appropriate time period. Consequently, if the filter time is too short, the cooking medium may not be not adequately filtered. If the filter time is too long, operating efficiency may be impaired, and cooking medium quality may be degraded unnecessarily by mechanical agitation and oxidation.

After filtering, the cooking medium may be returned to the frypot for further cooking. Known systems require an operator to operate a pump to refill the frypot with cooking medium. The amount of cooking medium in the frypot may vary based on the experience level of the operator, which may lead to inconsistencies in the quality of cooked food product. Moreover, such a refilling process requires the operator to supervise the refilling process, which reduces overall efficiency.

In addition, multiple frypots may be connected to a single drypan. Each frypot may be designated for cooking a different food product, e.g., chicken, french-fried potatoes, and fish. The flavor characteristics of each of these food products may become infused in the cooking medium. As a result, mixing cooking medium from frypots designated for different food products during filtering may adversely affect food quality, e.g., cooking chicken in a significant quantity of fish-flavored cooking medium may result in "fishy" chicken. Known filtering systems may permit an operator to simultaneously filter cooking medium for frypots designated for different food products, which may reduce the quality of cooked food product for the reasons noted above.

Figure 1:
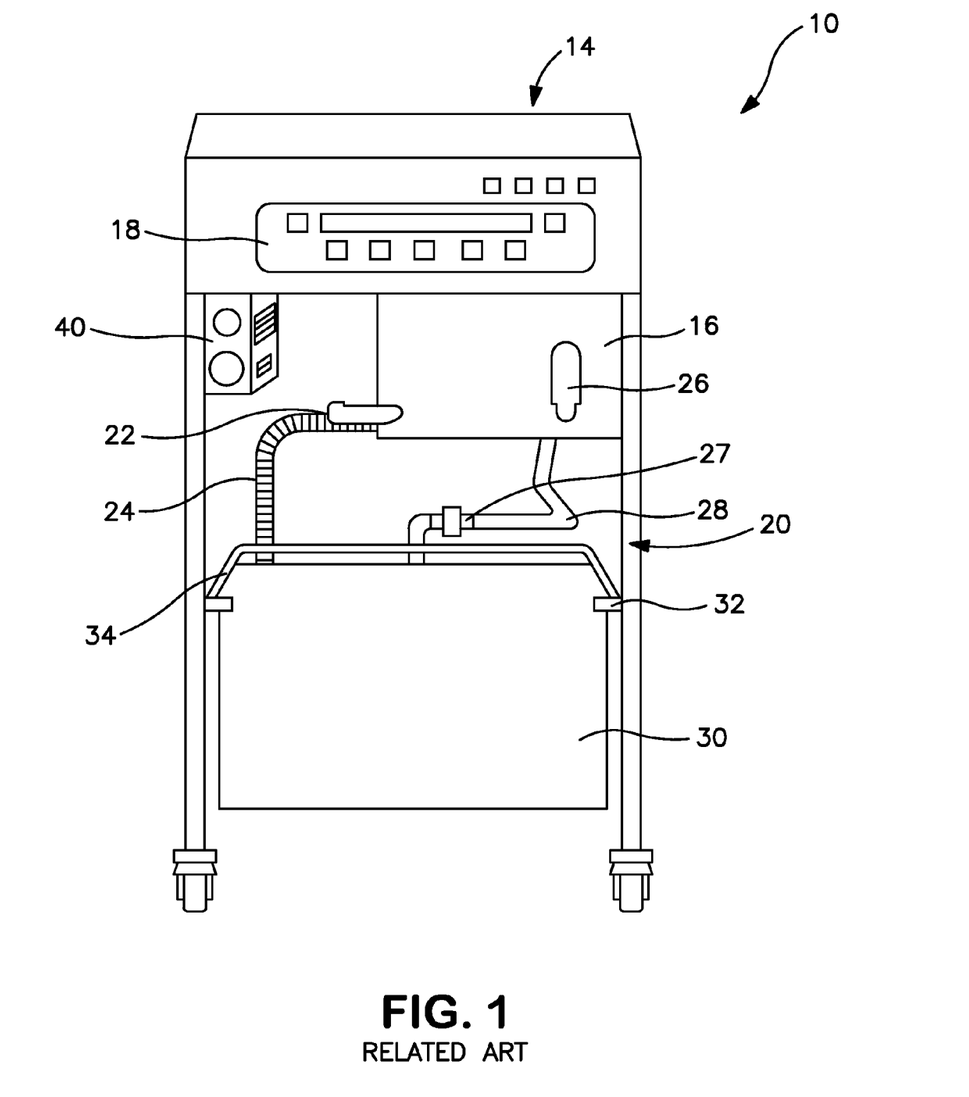
FIG. 1 is a front view of a fryer utilizing a known filtering system.
Figure 2:
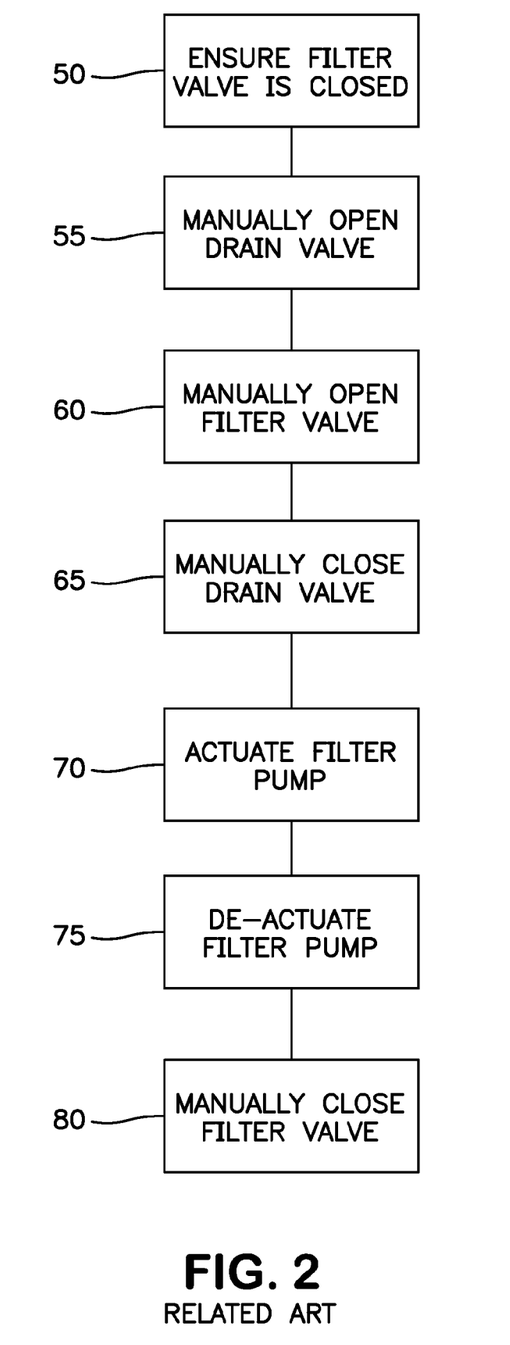
FIG. 2 is a flow chart showing a known method for operating the filter system shown in FIG. 1.

Referring to FIGS. 1 and 2, a fryer apparatus 10 comprising a known manual cooking medium filtering system and a known method for operating such a filtering system are depicted. Fryer apparatus 10 includes a frypot 16 having an open top 14 for receiving a food product. A cabinet 20, shown without a door for illustrative purposes, has brackets 32 supporting a drain pan 30 having a filter (not shown). Drain pan 30 includes a handle 34 that allows drain pan 30 to be removed from cabinet 20 for cleaning. Drain pan 30 is fluidly connected to frypot 16 via a drain hose 24 and a filter pipe 28. Disposed on filter pipe 28 is a filter pump 27 for drawing cooking medium to frypot 16 from pan 30. Frypot 16 includes a drain valve handle 22 that operates a drain valve (not shown) for selectively permitting cooking medium to drain from frypot 16 via hose 24. Frypot 16 also includes a filter valve handle 26 that operates a filter valve (not shown) for selectively permitting the introduction of cooking medium to frypot 16 from drain pan 30. Fryer apparatus 10 further may include a power supply 40 for powering filter pump 27, which may be actuated via a switch on control panel 18.

Referring to FIG. 2, a method for operating a known filtering system is depicted. To filter the cooking medium of fryer apparatus 10, the operator first ensures that the filter valve is closed 50. The operator turns drain valve handle 22 clockwise to manually open the drain valve 55, which uses gravity to permit the cooking medium to drain into drain pan 30. Next, the operator turns the filter valve handle 26 counter-clockwise to manually open the filter valve 60. The operator then turns drain valve handle 22 counter-clockwise to manually close the drain valve 55. The operator then actuates filter pump 70 using a switch that may be located on control panel 18. Next, the operator de-actuates the filter pump 75 to end the filtering process. Finally, the operator turns filter valve handle 26 in a clockwise direction to manually close the filter valve 80, so that operation of the fryer apparatus may resume.

Handles 22, 26 may be located in cabinet 20 beneath frypot 16. The above-described procedure is not intuitive unless the operator understands the logic and plumbing of the filter system, which generally is not the case for untrained operators. In known filtering systems, handles 22, 26 may be turned opposite directions to achieve the same result, in part because of design limitations within cabinet 20, which may add another element of complexity that may lead to operator error. Further, if one of the sequence of steps is omitted or executed out of order, then, at best, the operating efficiency of the fryer apparatus is impaired, and, at worst, the pump or frypot may be damaged. Even trained, experienced operators may omit or switch steps during peak cooking periods, e.g., the "lunch-rush."

SUMMARY OF THE INVENTION

Therefore, a need has arisen for filtering systems and methods for a cooking apparatus that overcome these and other shortcomings of the related art. A technical advantage of the present invention is that automatic filtering prevents incorrect valve operation, so that the filtering process is performed substantially correctly each time. Another technical advantage of the invention is that operating profits may be increased by reducing the personnel training needed by providing an automatic filtering system where the operator need only actuate a single switch to accomplish filtering. Yet another technical advantage of the invention is that precise control of the filtering cooking medium may be achieved, including automatic refilling of the frypot after a filtering operation is performed. Still another technical advantage of the invention is that mixing of significant amounts of cooking medium from frypots used to cook different food products, which may adversely affect cooked food product quality, may be reduced or eliminated.

The systems and methods of the invention are suitable for use with automatic filtering control systems and methods, such as those disclosed in U.S. patent application Ser. No. 11/563,656, filed on Nov. 27, 2006, entitled "AUTOMATIC OIL LEVEL CONTROL SYSTEMS AND METHODS," and U.S. patent application Ser. No. 11/563,597, filed on Nov. 27, 2006, entitled "AUTOMATIC COOKING MEDIUM FILTERING SYSTEMS AND METHODS," the disclosures of which are hereby incorporated by reference in their entirety.

According to an embodiment of the present invention, an automatic cooking medium filtering system includes a cooking vessel having an opening for receiving food product, the cooking vessel is configured to accommodate a cooking medium; a filter container having a removable filter configured to filter cooking medium, the filter container is fluidly connected to the cooking vessel; a fill manifold disposed on a fluid communication path between the filter container and the cooking vessel; a supply mechanism configured to supply cooking medium from the filter container to the cooking vessel; a pressure sensor configured to sense a pressure of the cooking medium supplied from the filter container; and a controlling mechanism receiving sensed pressure data from the pressure sensor, the controlling mechanism configured to control the supply mechanism in response to the sensed pressure data to provide the cooking medium from the filter container to the cooking vessel. The control mechanism is configured to stop the supply mechanism when the pressure sensor senses a drop in the pressure of cooking medium that is greater than or equal to a predetermined pressure drop threshold.

According to another embodiment of the present invention, a method for automatically filtering cooking medium in a cooking vessel includes the steps of: draining cooking medium from a cooking vessel; filtering cooking medium through a filter; supplying the filtered cooking medium back to the cooking vessel with a supplying mechanism; sensing a pressure of cooking medium supplied to the cooking vessel; and controlling the supplying of filtered cooking medium based on the sensed pressure of the filtered cooking medium. The sensing step includes the substeps of: sensing the pressure of cooking medium at a first interval; sensing the pressure of cooking medium at a second interval; and determining a change in the pressure of cooking medium between the first interval and the second interval. The controlling step includes halting the supply of cooking medium when sensing that the change in cooking medium pressure is a pressure drop that is greater than or equal to a predetermined pressure drop threshold.

According to yet another embodiment of the invention, a system for automatically filtering a cooking medium of a cooking apparatus includes: a cooking vessel having an opening formed therein for receiving food product, the cooking vessel is configured to accommodate a cooking medium; a filter container having a removable filter configured to filter cooking medium in fluid communication with the cooking vessel; a means for supplying cooking medium along a fluid communication path between the filter container and the cooking vessel; an expansion chamber disposed on the fluid communication path between the filter container and the cooking vessel; a means for sensing a pressure of the cooking medium supplied from the filter container to said cooking vessel; a means for controlling an operation of the supply means in response to sensed pressure of the cooking medium, the control means halts the operation of the supply means when said sensing means senses a drop in the pressure of cooking medium that is greater than a predetermined pressure drop threshold; and a means for indicating that the cooking vessel is filled with cooking medium after sensing the predetermined pressure drop threshold.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF THE INVENTION

Preferred embodiments of the present invention, and their features and advantages, may be understood by referring to FIGS. 3-9, like numerals being used for corresponding parts in the various drawings.

Figure 3:
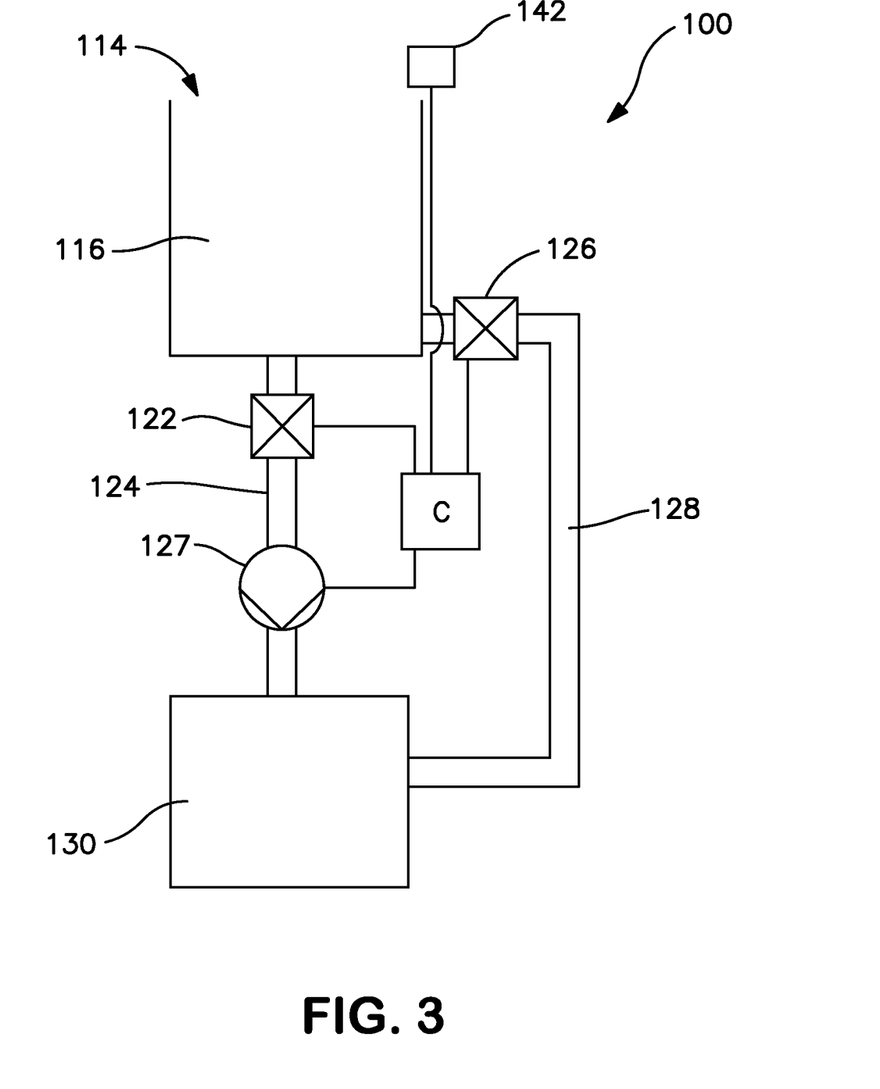
FIG. 3 is a schematic view of an automatic cooking medium filtering system according to an embodiment of the invention.

Referring to FIG. 3, a filtering system 100 according to an embodiment of the present invention is depicted. Filtering system 100 may comprise at least one cooking vessel 116, e.g., a frypot, which may be configured to hold a cooking medium, e.g., an oil, a liquid shortening, a meltable-solid shortening, or the like. Cooking vessel 116 may include an opening 114 for receiving a food product. A heating element (not shown), which may be a heating coil, is disposed within cooking vessel 116 for heating the cooking medium within vessel 116. Filtering system 100 may be utilized in a gas or electric fryer. FIG. 3 depicts vessel 116 suitable for an open-well fryer, but filtering system 100 also be used in a pressure fryer.

Cooking vessel 116 may comprise a drain at an inlet of a drain path 124 fluidly connecting vessel 116 to a filter container 130, e.g., a drain pan or a filter canister. A drain valve 122, which may be a solenoid valve, may be disposed on drain path 124 to permit selectively cooking medium to drain from vessel 116 in response to a control signal from a controller C. Preferably, drain valve 122 is a linearly actuated valve to reduce the likelihood that cooking by-products may obstruct valve 122. Cooking medium may pass through filter container 130 holding a removable filter pad, such as a Henny Penny SmartFilter™ or other known permeable filters for filtering a cooking medium. Subsequently, the cooking medium may return to vessel 116 via a fill path 128. A second filter container (not shown) that may serve as a backup filter also may be connected to paths 124, 128, when a filter in container 130 requires replacing or otherwise malfunctions. A fill valve 126, which also may be a solenoid valve, may be disposed on fill path 124 to selectively permit cooking medium to be introduced into vessel 116 in response to a control signal from controller C.

Referring to FIG. 3, a filter pump 127 is disposed on drain path 124 to convey the cooking medium along drain and fill paths 124, 128, but pump 127 also may be disposed on fill path 128. Pump 127 actuates and de-actuates in response to a control signal from controller C. Any suitable pump may be used. In one embodiment, pump 127 may be a roller pump, such as a series 0500 roller pump, manufactured by Hypro, Inc., of New Brighton, Minn. Controller C may comprise a processor coupled to a physical memory, an operator input, e.g., a push-button manual switch or an electronic switch, and a mechanism to detect whether the cooking medium is in suitable condition for filtering. Controller C may be coupled to an indicator 142, e.g., a visual or audible alarm that indicates either that a filtering process is being performed by system 100 or that the cooking medium in vessel 116 is not in suitable condition for filtering. Indicator 142 may be a light, e.g., incandescent, fluorescent, LED, or the like, or indicator 142 may be incorporated into the fryer's current display, such as on an LCD screen. If indicator 142 is an LED light, it may be on to indicate filtering of the cooking medium, and may blink or flash to indicate the cooking medium is not available, i.e., not ready for, filtering.

Figure 5:
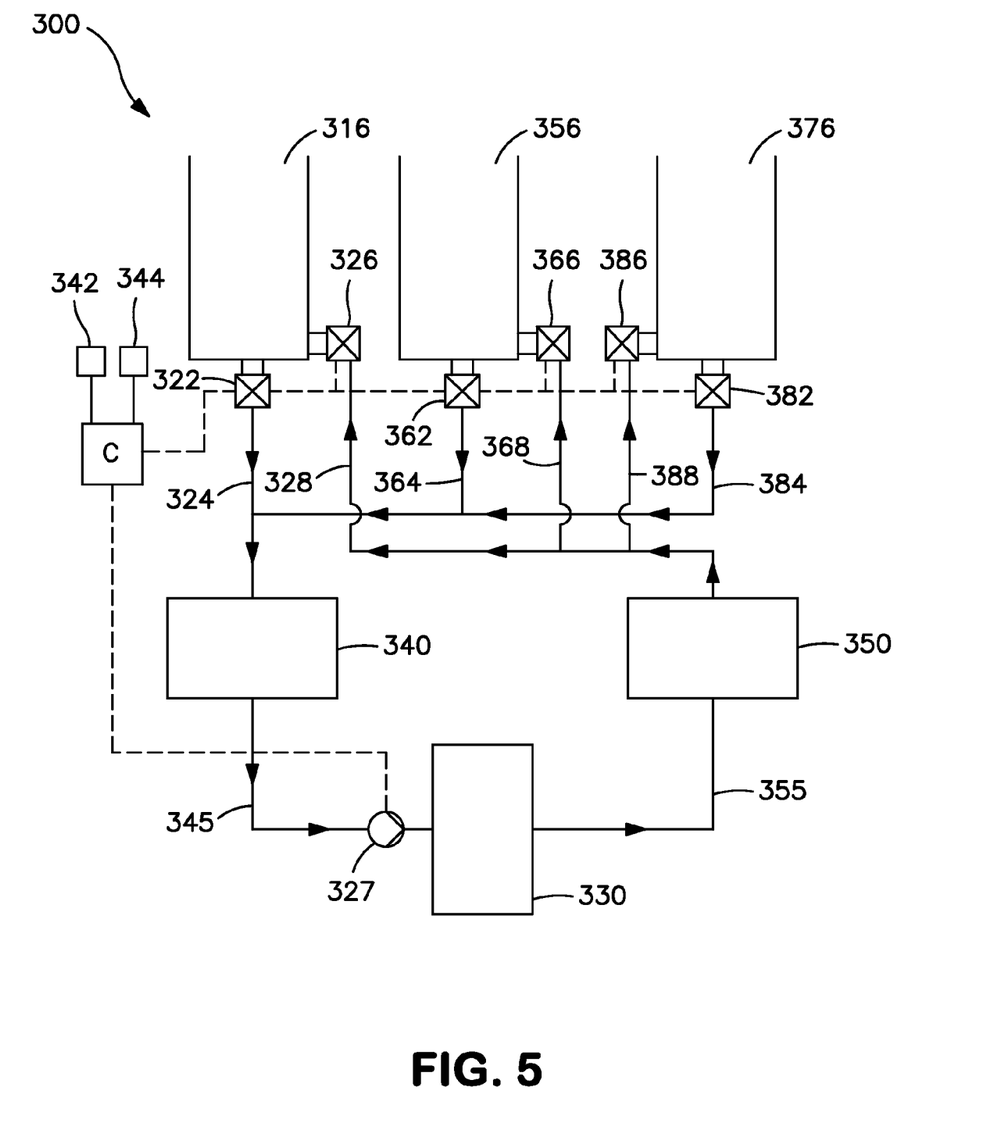
FIG. 5 is a schematic view of an automatic cooking medium filtering system according to another embodiment of the invention.

Drain and fill manifolds (not shown) may be disposed on the respective drain and fill paths, such an arrangement may permit the use of a smaller filter container that has an insufficient capacity to hold the entire volume of cooking medium within vessel 116, or may allow multiple vessels to be connected to the same filter container wherein a multiple vessel, fryer may use a single filtering system, as shown, for example, in FIG. 5.

Figure 4A:
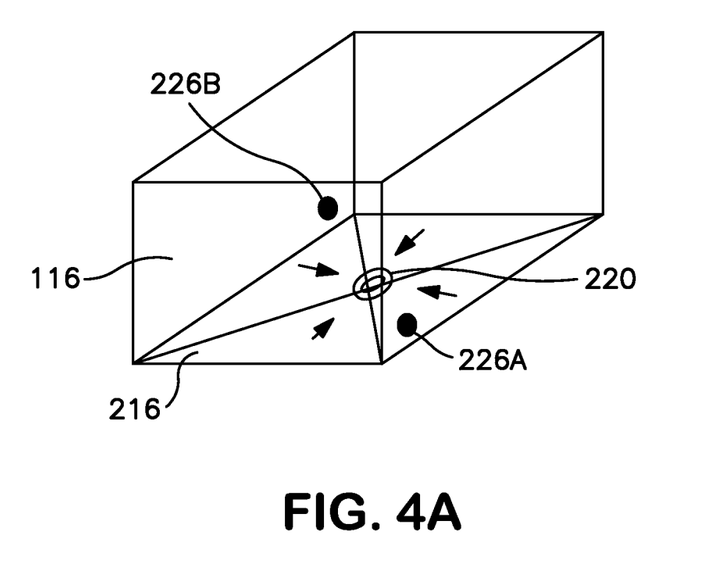
FIG. 4A is a perspective view of a cooking vessel according to an embodiment of the invention.
Figure 4B:
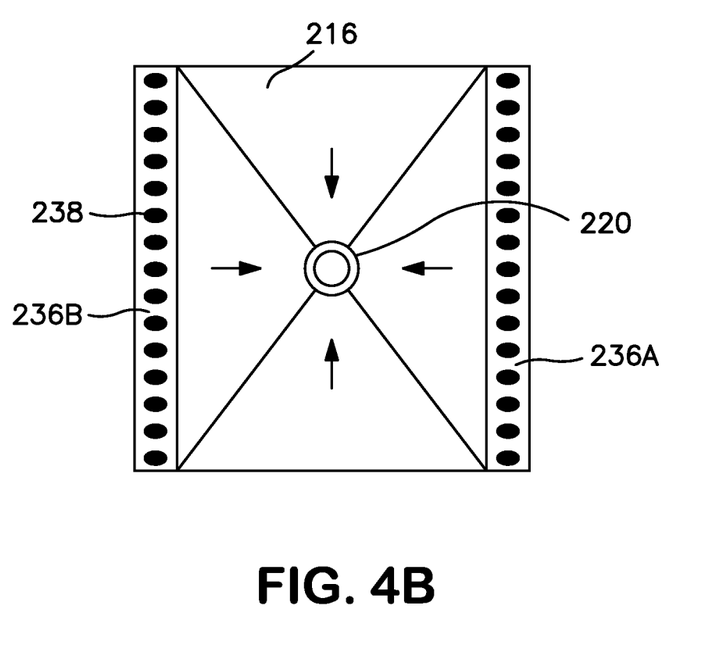
FIG. 4B is a plan view of a cooking vessel according to another embodiment of the invention.

Referring to FIG. 4A and FIG. 4B, arrangements for cooking medium inlets fluidly connected to fill path 128 according to embodiments of the invention are depicted. As shown in FIG. 4A, a pair of inlets 226A, 226B may be formed within a surface of cooking vessel 116 disposed at opposite ends of a longitudinal axis, i.e., a length, of vessel 116. For example, inlets 226A, 226B are shown here as formed within opposing sidewalls of vessel 116. Inlets 226A, 226B may be separated by a lateral distance that is substantially a width of vessel 116. Arranging inlets 226A, 226B in this configuration may facilitate a spiral flow, e.g, swirling, of the cooking medium on a bottom surface 216 of vessel 116 to clean bottom surface 216, wherein cooking by-product or any other particles may exit vessel 116 through a drain 220. Bottom surface 216 may be sloped towards drain 220 to assist cooking medium, and any cooking by-product therein, to exit vessel 116. Preferably, inlets 226A, 226B are disposed proximate to bottom surface 216.

Referring to FIG. 4B, an alternative inlet arrangement is depicted. A pair of linear diffuser headers 236A, 236B may extend along opposing sides of bottom surface 216. Diffuser headers 236A, 236B also may be disposed on opposing sidewalls of vessel 116 proximate to bottom surface 216. Preferably, diffuser headers 236A, 236B extend substantially parallel to a longitudinal axis, i.e., along a length, of vessel 116. Diffuser headers 236A, 236B may comprise a plurality of inlet holes 238 for introducing cooking medium via filter path 128. Preferably, inlet holes 238 are configured to direct cooking medium towards a center axis of bottom surface 216 to promote the spiral flow of cooking medium for the reasons described above. Again, bottom surface 216 may be sloped towards drain 220.

Referring to FIG. 5, a filtering system 300 according to another embodiment of the present invention is depicted. Filtering system 300 may comprise a plurality of cooking vessels 316, 356, 376, e.g., frypots. Each vessel 316, 356, 376 may comprise a drain path 324, 364, 384 fluidly connected to a common, drain manifold 340. If two vessels, e.g., vessels 316 and 356, are designated for a same first food product, and the third vessel, e.g., vessel 376, is designated for a different second food product, then vessels 316, 356 may be connected fluidly to a first drain manifold, while vessel 376 may be connected fluidly to a second drain manifold to segregate further the flavors infused in the cooking mediums for the respective first and second food products. A drain valve 322, 362, 382, responsive to a control signal from controller C, may be disposed along each drain path 324, 364, 384.

Drain manifold 340 may be connected fluidly to filter container 330 on a manifold drain path 345. An outlet (not shown) of the filter container 330 may be connected fluidly to a fill manifold 350 through a manifold fill path 355. A pump 327 may be disposed along either manifold path 345, 355 to draw cooking medium through filter container 330, which may hold a removable filter media for filtering cooking medium, such as a filter pad. In this exemplary embodiment, pump 327, which may be responsive to a control signal from controller C, is shown as disposed on manifold drain path 345. Fill manifold 350 may be fluidly connected to each vessel 316, 356, 376 via a respective fill path 328, 368, 388. A fill valve 326, 366, 386, responsive to a control signal from controller C, may be disposed along each fill path 326, 366, 386.

Controller C may be actuated by an operator using a single switch 344, e.g., a mechanical or an electronic switch. An indicator 342 coupled to controller C may give a visual or audible indication that filtering of cooking medium from at least one vessel 316, 356, 376 is being performed, or that the cooking medium in at least one of the vessels is not available, i.e., ready, for filtering for filtering. Indicator 342 also may indicate that the cooking medium needs filtering, and such indication may be based on a predetermined number of cooking cycles for which the cooking medium has been used or sensing the condition of the cooking medium to determine that it is no longer efficient for cooking food product and requires filtering or changing.

Figure 6:
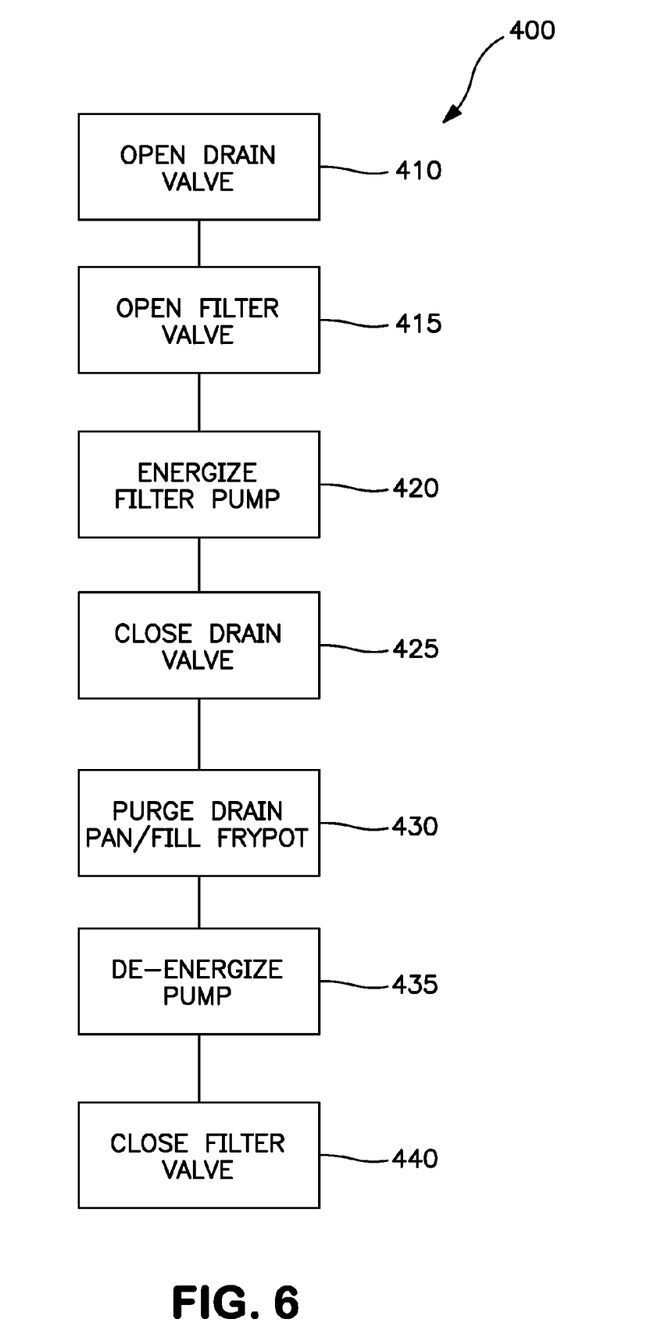
FIG. 6 is a flow chart showing a method for automatically filtering a cooking medium according to an embodiment of the invention.

FIG. 6 shows an exemplary embodiment of a method for automatically filtering a cooking medium of a cooking vessel, e.g., a frypot. First, the operator may request the cooking medium in a cooking vessel to be filtered, e.g., by actuating a switch. Next, a controller may determine whether the cooking medium in the vessel is not available, i.e., ready, for filtering. Parameters used for determining whether the cooking medium is ready for filtering may include, but are not limited to, the temperature of the cooking medium, any turbulence detected in the cooking medium, or whether food product is within the vessel. Further, if the method is used with a fryer apparatus having a plurality of cooking vessels, not more than one vessel may be suitable for filtering at any time, so that multiple vessels will not be filtered concurrently, in part, to prevent mixing of a significant amount of cooking medium from different vessels. Once it is determined that the cooking medium is ready for filtering, then filtering of the cooking medium may begin.

Referring to FIG. 6, a method 400 for automatically filtering the cooking medium according to one embodiment of the invention now is described. First, in step 410, a drain valve may be opened automatically to permit cooking medium to exit, or drain, the cooking vessel. Next, in step 415, a filter valve may be opened automatically to permit introduction of cooking medium into the vessel. Subsequently, a filter pump may be energized in step 420 to pass the cooking medium through a container, such as a drain pan or filter canister, to filter the cooking medium. Both the drain valve and the filter valve may be open concurrently when the pump is energized to enable a flow of cooking medium to coat or swirl on a bottom surface of the cooking vessel for cleaning purposes. After letting the cooking medium clean the bottom surface of the vessel for a predetermined period, the drain valve may be closed automatically in step 425 to allow purging of the filter container and filling of the vessel with cooking medium in step 430. Next, the pump may be de-energized in step 435 after filling the vessel. Finally, the filter valve may be closed automatically in step 440 to prevent drainage of cooking medium into the filter container and complete the filtering of cooking medium from the cooking vessel.

Figure 7:
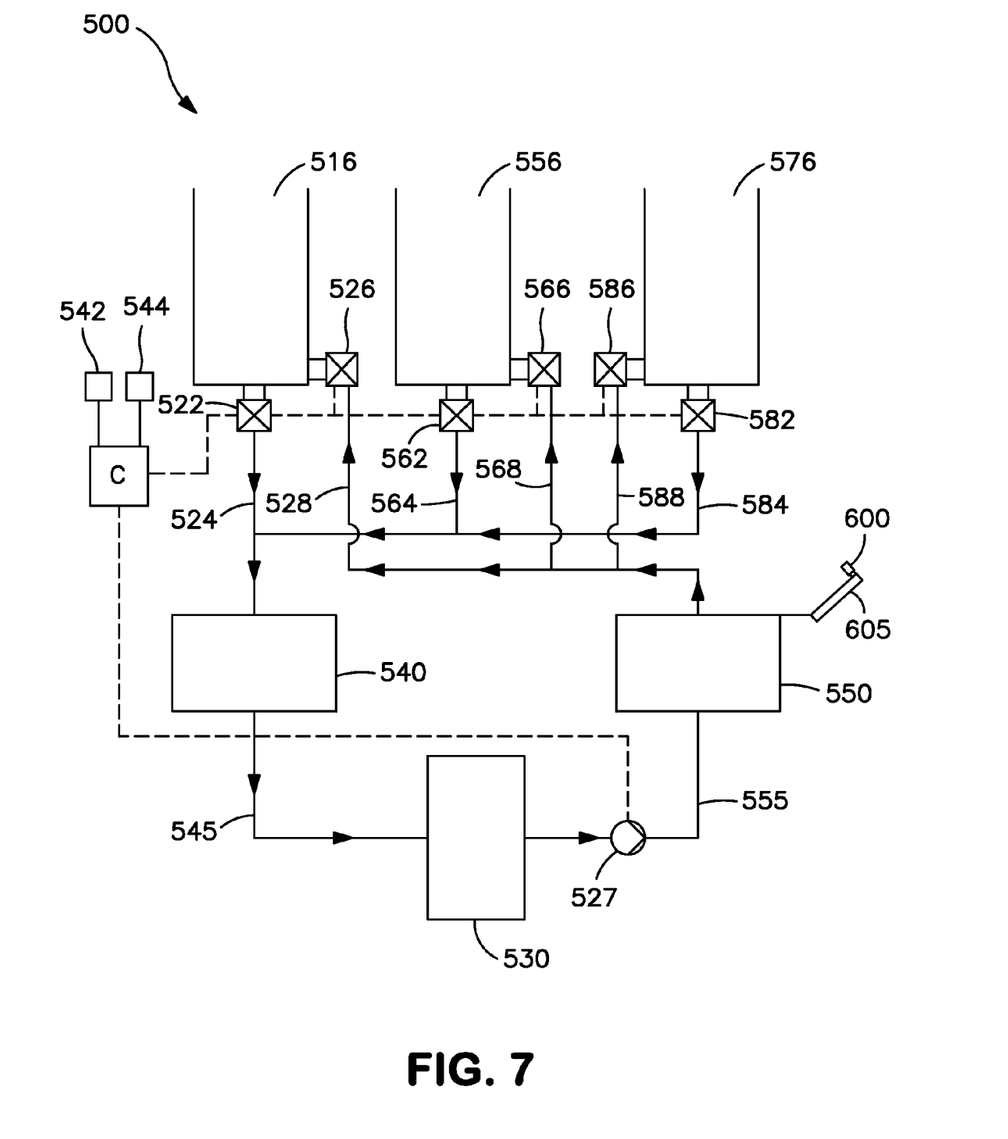
FIG. 7 schematic view of an automatic cooking medium filtering system according to still yet another embodiment of the invention.

Referring to FIG. 7, a filtering system 500 according to yet another embodiment of the present invention is depicted. Filtering system 500 may comprise a plurality of cooking vessels 516, 556, 576, e.g., frypots. Each vessel 516, 556, 576 may comprise a drain path 524, 564, 584 fluidly connected to a common, drain manifold 540. A drain valve 522, 562, 582, responsive to a control signal from controller C, may be disposed along each drain path 524, 564, 584.

Drain manifold 540 may be connected fluidly to filter container 530 on a manifold drain path 545. Filter container 530, which may hold a removable filter media for filtering cooking medium, such as a filter pad, may be connected fluidly to a fill manifold 550 via a manifold fill path 555. A filter pump 527 may be disposed on either manifold path 545, 555 to draw cooking medium through filter container 530 and return to cooking medium to a selected vessel 516, 556, 576. Pump 527, which may be responsive to a control signal from controller C, is shown as disposed along manifold fill path 555. Fill manifold 550 may be fluidly connected to each vessel 516, 556, 576 via a respective fill path 528, 568, 588. A fill valve 526, 566, 586, responsive to a control signal from controller C, may be disposed along each fill path 526, 566, 586. A pressure sensor 600, such as a pressure transducer, or the like, may be provided to sense the pressure of the cooking medium supplied through fill path 555 or manifold 550. In the exemplary embodiment of FIG. 7, pressure sensor 600 is set up to sense the pressure of cooking medium in fill manifold 550. While pump 527 is operating to refill one of vessels 516, 556, 576, after a filtering operation, pressure sensor 600 will sense a pressure of cooking medium. When a selected vessel nearly is refilled, there may be little or no cooking medium in the fill path 555 or manifold 550, which results in a drop in the pressure of the cooking medium. Pressure sensor 600 may sense the drop in pressure in this cooking medium, and controller C may determine that the vessel is refilled, and a filtering operation is complete.

Controller C may be actuated by an operator using a single switch 544, e.g., a mechanical or an electronic switch. An indicator 542 coupled to controller C may give a visual or audible indications regarding the status of the cooking medium or vessel, as described with respect to indicator 342. Moreover, in response to the pressure data sensed by sensor 600, indicator 542 may give a visual or audible indication that one of the vessels is refilled with cooking medium after a filtering operation. In addition, if the selected vessel is not refilled before the expiration of a predetermined fill time or if the cooking medium does not achieve a minimum fill pressure, controller C may send a signal to indicator 542 to indicate that a filter requires changing.

During a refilling operation after the cooking medium is filtered, in some instances there may be no outlet for the cooking medium supplied by pump 527 due to a fault in the system, such as failure of one of the solenoid valves or an obstruction in one of the manifolds. This condition is known as a deadhead condition which may result in the generation of high pressures in fill manifold 550; such pressures may reach 400-600 p.s.i. (about 2800-4200 kPa). These deadhead pressures may cause the pressure sensor to fail as these pressures greatly exceed the known proof pressure of a transducer having deformable diaphragm, such as a Ashcroft G2 pressure transducer, used in one exemplary embodiment of the invention, which may have a proof pressure of about 90 p.s.i. (about 630 kPa) and a burst pressure of about 450 p.s.i. (about 3150 kPa).

In the event of a deadhead condition, pump 527 will attempt to transit cooking medium from the filter pan 530 back to a selected vessel 516, 556, 576 via fill manifold 550. Because there is no outlet for the cooking medium, pressure within the fill manifold 550 may start to build up. If pressure sensor 600 senses that the air pressure exceeds a predetermined burst threshold, controller C may halt the operation of pump 527 to prevent a build up of deadhead pressure that could damage the pressure sensor. After pressure sensor 600 senses a predetermined drop in pressure of cooking medium below the burst threshold, controller C may reactivate pump 527 and recommence the refilling operation.

In order to mitigate the effects of deadheads, the system may also include an expansion chamber 605 in fluid communication with fill manifold 550, into which cooking medium expands as pump 527 pressurizes cooking medium, so that it may be supplied to a selected vessel 516, 556, 576 after a filtering operation. The geometry of expansion chamber 605 may vary, but chamber 605 should encompass a sufficient volume to slow pressure build-up during a deadhead. Pressure sensor 600 may be located above an expansion chamber to prevent immersion in the cooking medium within expansion chamber. Moreover, expansion chamber may be configured to permit cooking medium to drain out to preserve an air charge within expansion chamber 605 that may reduce a build-up of deadhead pressure.

Because pump 527 may continue to generate pressure after the controller C sends a control signal to halt operation, the deadhead pressure in expansion chamber 605 or fill manifold 550 still may exceed the predetermined burst threshold. A large hysteresis between the predetermined burst pressure and the pressure at which pump is reenergized may be desirable to prevent damage to pressure sensor 600. In an exemplary embodiment, for example, when an Ashcroft G2 pressure transducer, which has a proof pressure of 90 p.s.i. (about 630 kPa), serves as pressure sensor 600, the predetermined burst threshold may be set at 30 p.s.i. (about 210 kPa) but the ultimate deadhead pressure may reach 30 p.s.i. to 60 p.s.i (about 210 kPa to 420 kPa) as pump 527 is halting operation. Thus, controller C may be set to reenergize pump 527 at a pressure of 5 p.s.i. (about 35 kPa) so that a second deadhead condition would not result in pressures capable of damaging the pressure sensor. Moreover, the significant degree of hysteresis may permit cooking medium to drain from expansion chamber 605 and restore its air charge.

Figure 8:
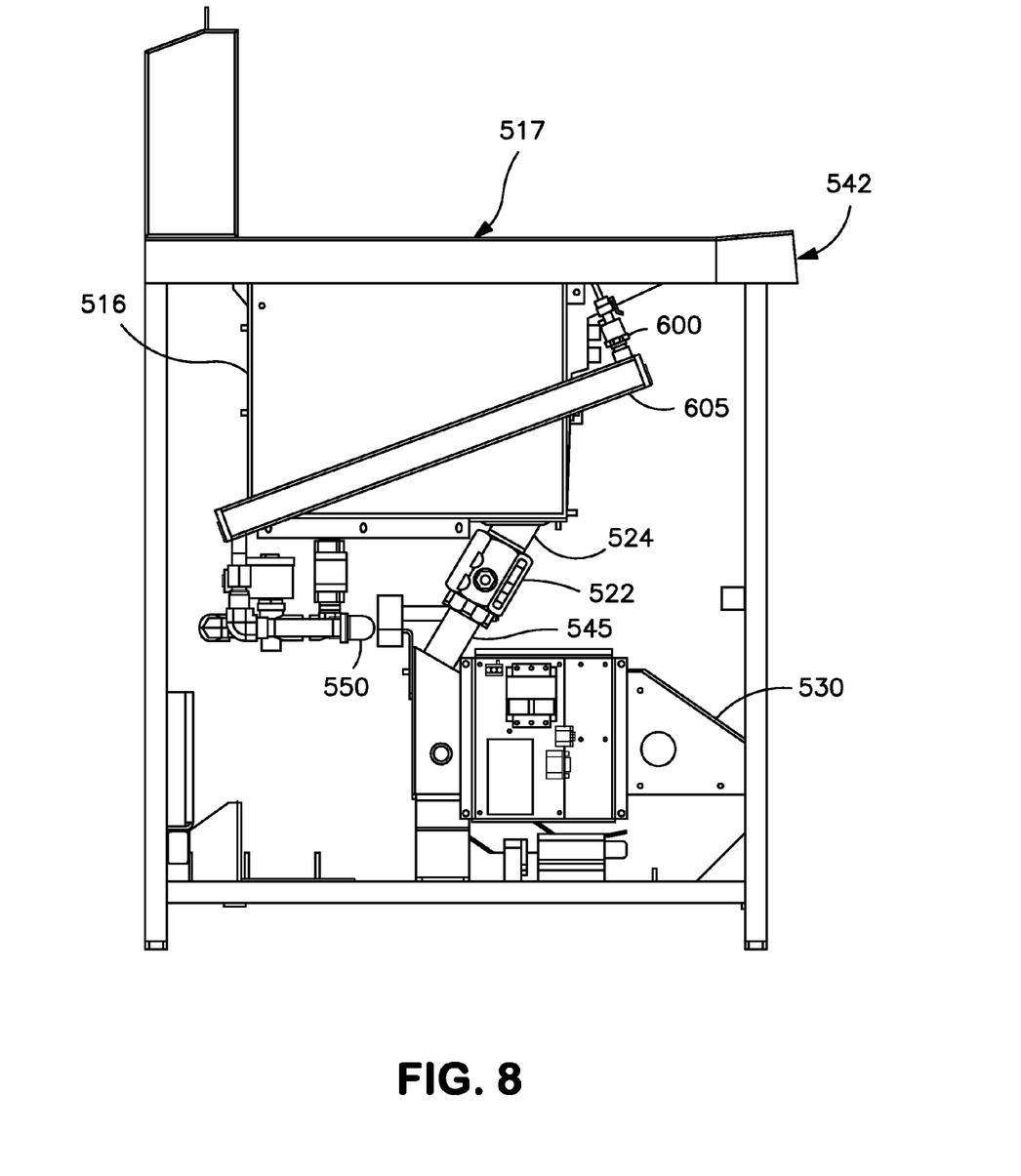
FIG. 8 is an elevational view of an automatic cooking medium filtering system according to still yet another embodiment of the invention.

In another exemplary embodiment, as shown in FIG. 8, expansion chamber 605 may be set at an angle of at least 20 degrees relative to a horizontal plane of the fryer apparatus, parallel to a plane defined by an opening 517 of vessel 516, to position pressure sensor above an inlet of expansion chamber 605 in fluid communication with fill manifold 550. Such a configuration not only preserves the air charge within expansion chamber 605, but also may substantially prevent cooking medium from contacting pressure sensor 600 and prevent food particles suspended in the cooking medium from clogging an inlet of pressure sensor 600, which may increase the response time of the pressure sensor and prevent reliable sensing of cooking medium pressure. In a closed system, the air charge and the cooking medium within expansion chamber 605 may be substantially at the same pressure, and, thus, obviates the need to submerge the pressure sensor in cooking medium to accurately sense the pressure of cooking medium as it is supplied to vessels 516, 556, 576.

Figure 9:
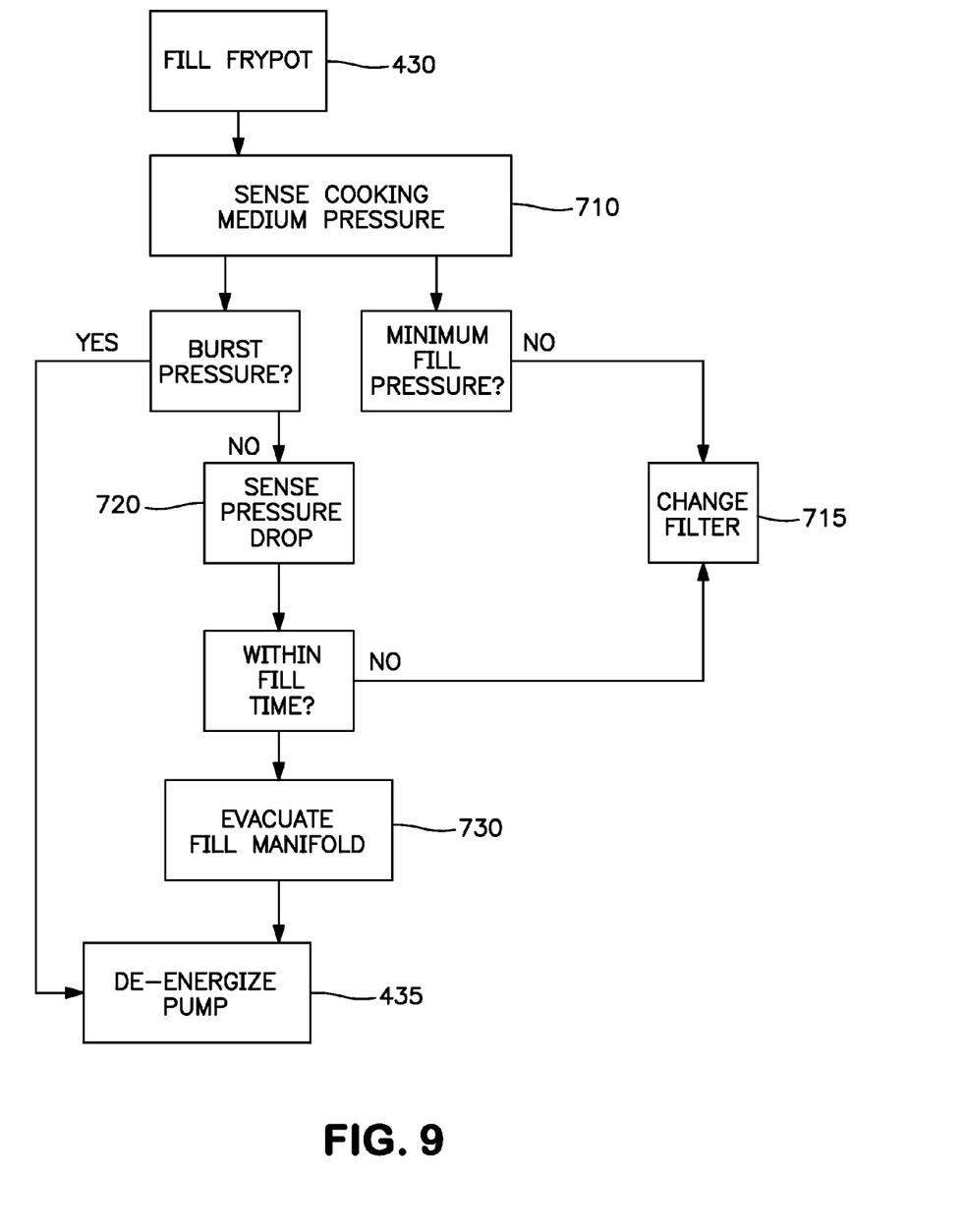
FIG. 9 is a flow chart showing a method for automatically refilling a cooking vessel with cooking medium after a filtering operation according to another embodiment of the invention.

Referring to FIG. 9, a refilling operation 700 of the filtering system now is described. The refilling operation 700 may take place between filling the vessel at step 430 and de-energizing the pump at step 435 of method 400 for automatic filtering of a cooking medium. When a vessel is refilled with filtered cooking medium at step 430, the pressure of the cooking medium supplied to one of the vessel may be sensed at step 710. The cooking medium pressure may fail to reach a predetermined minimum fill pressure due to filter reaching the end of its operational life. Thus, at step 715, the indicator may give a "CHANGE FILTER" indication when the system fails to sense that the cooking medium pressure reaches the minimum fill pressure, which may prompt the operator to change the filter pad. In one exemplary embodiment, a fill pressure is at least about 4 p.s.i. (about 28 kPa). At step 720, the sensor may detect a pressure drop exceeding a predetermined pressure drop threshold, such as, for example, a 3 p.s.i (about 21 kPa) drop in pressure of the cooking medium supplied to a cooking vessel. Such a pressure drop may indicate that the filtered cooking medium has been pumped out of the fill manifold back to the vessel. If the pressure drop threshold is not detected before the expiration of a predetermined fill time, such as, for example, 4 minutes, the indicator at step 715 may give a "CHANGE FILTER" indication to replaced the aged filter pad. In the case of a deadhead, when the predetermined burst pressure is sensed, the controller may de-energize the pump at step 435.

After detecting the pressure drop at step 720, the controller may continue the operation of the pump for a predetermined evacuation period to evacuate the cooking medium from the fill manifold at step 730. In one exemplary embodiment, the predetermined evacuation period is approximately 8 seconds. After evacuation of the fill manifold at step 730, a controller may de-energize the pump at step 435. When a "CHANGE FILTER" condition is met, the method may continue to a subsequent step but the "CHANGE FILTER" condition is indicated to an operator. Nevertheless, when the burst pressure is sensed, the pump may be de-energized immediately at step 435, without performing further refilling of the cooking vessel, to prevent build-up of deadhead pressures that may damage the pressure sensor.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A method for automatically filtering cooking medium in a cooking vessel, the method comprising the steps of:
   draining the cooking medium from a cooking vessel;
   filtering the cooking medium through a filter;
   supplying the cooking medium from a fill manifold to the cooking vessel with a supplying mechanism, wherein the fill manifold is disposed on a fluid communication path between the filter and the cooking vessel and comprises a first opening configured to permit cooking medium to enter the fill manifold, a second opening configured to permit cooking medium to exit the fill manifold to the cooking vessel, and a third opening connected to an expansion chamber having a first end adjacent the third opening;
   sensing a pressure of cooking medium supplied to the cooking vessel with a pressure sensor, wherein the pressure sensor is adjacent a second end of the expansion chamber and the expansion chamber is inclined such that the second end is disposed above the first end to preserve an air-charge for reducing build-up of deadhead pressure and prevent immersion of said pressure sensor in the cooking medium, the sensing step comprising:
      sensing the pressure of cooking medium at a first interval;
      sensing the pressure of cooking medium at a second interval; and
      determining a change in the pressure of cooking medium between the first interval and the second interval;
   controlling the supplying of filtered cooking medium based on the sensed pressure of the filtered cooking medium being supplied to the cooking vessel;
   wherein the step of controlling comprises halting said supplying step when sensing that the change in the pressure of cooking medium is a pressure drop that is greater than or equal to a predetermined pressure drop threshold.

2. The method of claim 1, wherein said supplying step comprises supplying cooking medium for a predetermined evacuation period after sensing the pressure change greater than or equal to the predetermined pressure drop threshold.

3. The method of claim 2, wherein the predetermined evacuation period is greater than or equal to about 5 seconds.

4. The method of claim 1, wherein the predetermined pressure drop threshold is greater than or equal to about 21 kPa.

5. The method of claim 1, further comprising the step of indicating that the cooking vessel is filled with cooking medium after sensing the predetermined pressure drop threshold.

6. The method of claim 5, further comprising the step of indicating that the filter requires changing after sensing that the cooking medium pressure during the supplying step is less than or equal to a minimum fill pressure threshold.

7. The method of claim 5, further comprising the step of indicating that the filter requires changing after sensing that the cooking medium pressure during the supplying step is greater than or equal to the minimum fill pressure for a predetermined fill time.

8. The method of claim 5, further comprising the step of indicating that the filter requires changing after failing to sense the predetermined pressure drop threshold during the supplying step within a predetermined fill time.

9. The method of claim 1, further comprising the step of providing a pressure sensor to perform said sensing step after said filtering step.

10. The method of claim 9, further comprising the steps of:
    providing an expansion chamber in fluid communication with the pressure sensor;
    wherein the step of controlling includes halting said supplying step when sensing the cooking medium pressure is greater than or equal to a predetermined burst pressure threshold.

11. The method of claim 10, wherein the predetermined burst pressure threshold is approximately 210 kPa.

\* \* \* \* \*